United States Patent [19]

Luhleich et al.

[11] 4,314,599
[45] Feb. 9, 1982

[54] PROCESS FOR MAKING A STARTING MATERIAL FOR THE MANUFACTURE OF ARTIFICIAL GRAPHITE ARTICLES

[75] Inventors: Hartmut Luhleich, Duren; Francisco J. Dias, Jülich, both of Fed. Rep. of Germany

[73] Assignee: Kernforschungsanlage Jülich, Gesellschaft mit beschränkter Haftung, Jülich, Fed. Rep. of Germany

[21] Appl. No.: 104,755

[22] Filed: Dec. 18, 1979

Related U.S. Application Data

[63] Continuation of Ser. No. 886,419, Mar. 14, 1978, abandoned.

[30] Foreign Application Priority Data

Mar. 23, 1977 [DE] Fed. Rep. of Germany ....... 2712628

[51] Int. Cl.³ .................. C08G 51/24; C09D 5/02
[52] U.S. Cl. .................................. 164/16; 260/38; 427/221; 164/527
[58] Field of Search .................. 106/307; 260/38; 427/221; 164/16, 41

[56] References Cited

U.S. PATENT DOCUMENTS

| | | | |
|---|---|---|---|
| 2,655,490 | 10/1953 | Sonnabend | 260/38 |
| 3,031,344 | 8/1962 | Sher | 260/38 |
| 3,644,269 | 2/1972 | Horyt | 260/38 |
| 3,709,849 | 1/1973 | Tenon | 260/38 |
| 3,932,568 | 1/1976 | Watts | 260/38 |
| 4,009,143 | 2/1971 | Luhleich | 260/38 |

*Primary Examiner*—Sam Silverberg
*Attorney, Agent, or Firm*—Frishauf, Holtz, Goodman & Woodward

[57] ABSTRACT

A heat-coalescible graphitic aggregate for making graphite molds, graphite fuel elements or moderating elements for nuclear reactors, and so on, is made by first forming a suspension of carbon particles in an alkaline solution of phenolformaldehyde. The suspension is then mixed together with acidulated water, the latter being heated to 40° to 70° C. to accelerate the reaction, with violent mixing, as in a jet device, causing a skin of insoluble phenolformaldehyde to be applied as a coating to each of the particles in suspension, which particles readily settle out and are soon separated by decanting and filtration, after which the composite solid is dried and the aqueous liquid is neutralized before being discarded.

6 Claims, 1 Drawing Figure

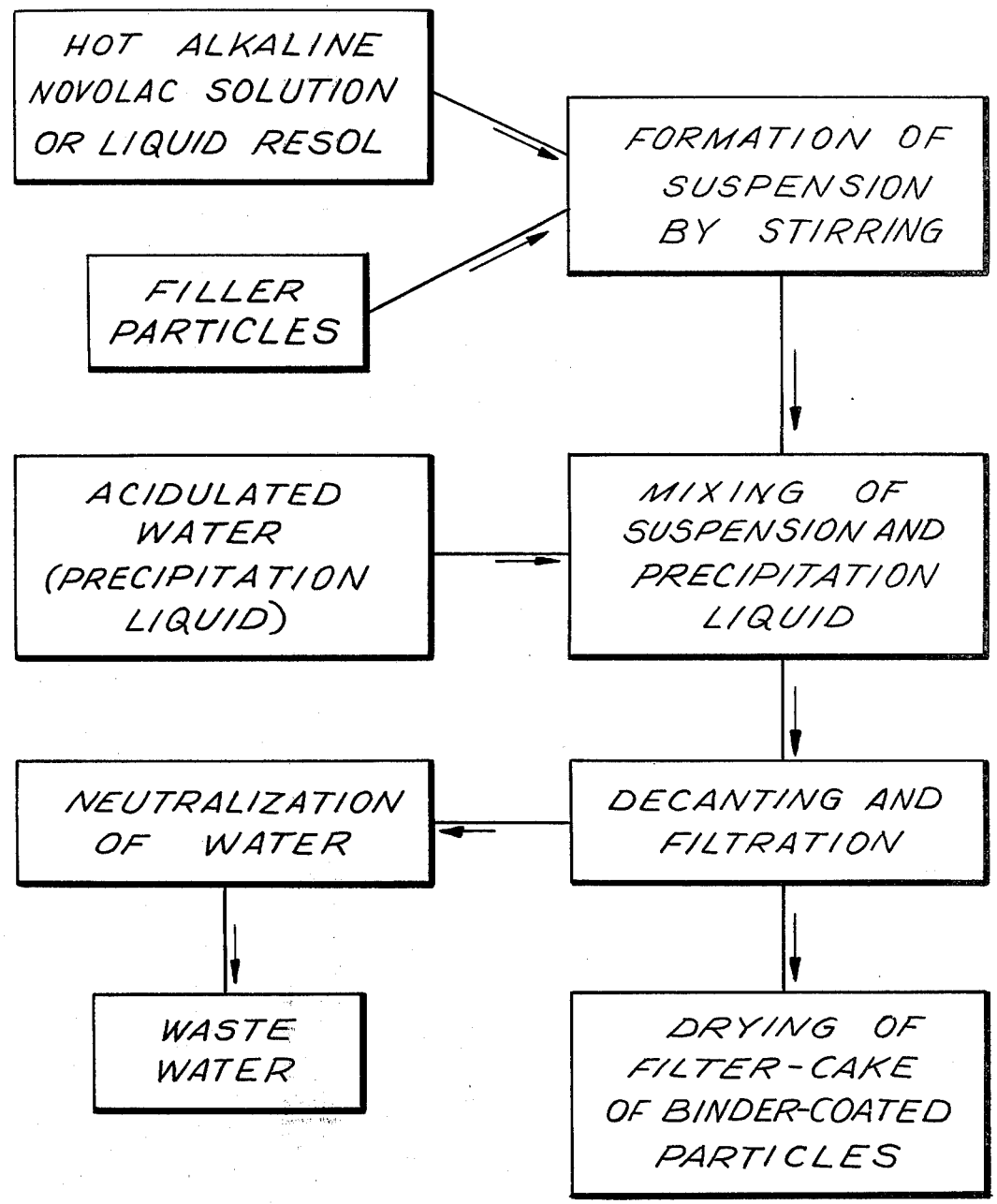

PROCESS FOR MAKING A STARTING MATERIAL FOR THE MANUFACTURE OF ARTIFICIAL GRAPHITE ARTICLES

This is a continuation, of application Ser. No. 886,419 filed on Mar. 14, 1978 now abandoned.

This invention concerns a process for producing a starting material for the manufacture of articles of artificial graphite and other graphite-like substances, particularly articles of such materials with a fine-grain graphite content. The process of the invention is of the general type in which a filler which is typically a mixture of two or more substances such as electrographite, natural graphite, carbon black, and ground coke, is suspended in a solution containing a binder, and then, in a mixing chamber, the suspension introduced by means of a mixing valve or nozzle into a liquid that precipitates the binder so that the filler grains or particles are evenly coated with the binder. The filler grains or particles thus coated with the binder film, which now form a muddy mass, are separated from the precipitating liquid by filtration or by decantation and filtration and, finally, are dried.

Such coated powders have many applications: for example, the manufacture of fuel elements or other components for gas-cooled high-temperature nuclear reactors. For the application just mentioned, the muddy or pasty mixture of filler, precipitating liquid, and solvent is molded and then coked by heating to about 800° C. and thereafter graphitized or subjected to other high-temperature treatment.

Processes for producing such a mixed powder material are known, being disclosed for example in German patent Nos. 2,040,252 and 2,132,492. In these known processes pitch, tar, or synthetic resin is used as the binding agent. On account of the use of these binders it was heretofore necessary to utilize a particular solvent for the binder. It was a requirement that this solvent should be miscible with the liquid used to precipitate the binder, in which the binder must be either insoluble or soluble only with difficulty. As solvent in the known process xylene, benzene and nitrobenzene, or an alcohol, particularly came into use. For the precipitation liquid, solutions of various concentrations of methanol in water were used, or even pure water.

The need to utilize solvents of the above-mentioned kind in the known processes has the disadvantage of subjecting the operating personnel concerned with the performance of the process, and also the environment, to a certain risk of damage that could not be overlooked. There was a further disadvantage that in the performance of the known process a relatively large liquid throughput was necessary, as well as the still further consequence that the quantities of waste water containing the above-mentioned solvent was correspondingly large. Finally, the mixed powder precipitated by the known processes also did not have the high degree of fineness desired in certain cases and accordingly had to be supplementally comminuted. On account of the solvents for the binder necessarily used in the known processes, residual amounts of solvent came out with powder filtered or decanted out of the liquid, with the result that the temperatures needed to dry the powder were severely limited for safety reasons.

It is an object of the invention to provide a process for making a composite powder suitable as a starting material for making articles of artificial graphite or graphite-like bodies in which the disadvantages of the known processes are avoided and in which the operation of the process is so greatly simplified that it can be carried out in a much more economical manner than the heretofore known processes for making similar materials.

SUMMARY OF THE INVENTION

Briefly, an alkaline solution of phenylformaldehyde in water is used to provide the binder, thus avoiding all organic solvents, and the filler grains and particles are suspended in the aforesaid alkaline solution, after which the phenolformaldehyde is precipitated as a coating on the suspended particles by mixing the suspension with acidulated water, preferably by injection through valve or nozzle, after which the coated particles are separated from the water by decantation, filtration or both decantation and filtration, and the coated powder particles so separated are thereafter dried. Preferably the acidulated water is heated to a temperature in the range from 40° to 70° C., typically 50° C. before the step of mixing it with the suspension. Both the novolac form of phenolformaldehyde and the resol form are usable to make up an alkaline water solution for the process.

A particularly useful application of the process just described is the making of molds for metallic or ceramic cast articles, either by producing a plastic mass from the powder particles from which the water has been dried away, by compacting the product into a paste and pressing masses of the paste into bodies of desired shape, followed by heating to a temperature in the range between 40° and 90° C. to coalesce and solidify the material, or else by simply filling a casting box with the particle mass and pressing a pattern therein and then solidifying the material surrounding the pattern by causing it to be permeated by vapors of a lower alcohol or of formaldehyde, or of mixtures of alcohol and formaldehyde.

When phenolformaldehyde is in a water-soluble form, in which it behaves as a water-soluble salt, it can be precipitated as an insoluble resin by the addition of an acid-precipitating liquid. In that manner it becomes possible, if phenolformaldehyde is chosen as the binder for a more-or-less graphitic filler material, to use an acid aqueous liquid to precipitate the dissolved binder in the manner just described. On this basic principle, therefore, in accordance with the invention, an alkaline aqueous solution of phenolformaldehyde is first formed and the particles of the more-or-less graphitic filler material are suspended in that solution, after which the suspension is mixed with acidulated water acting as the precipitating liquid in order to coat the filler grains evenly with binder material. The process according to the invention has the advantage, compared to the previously known processes, that two steps consuming much time and energy, namely the cooling of the binder-filler suspension before the actual mixing as well as the heating-up after mixing, are dispensed with. The composite powder drops out of the suspension in the process of the invention directly after mixing with the acidulated water. The product is separable by filtration and by decanting.

The process according to the invention can be further accelerated by heating the acidulated water to a temperature from about 40° to about 70° C. before mixing the suspension with it.

It has been found that the product made according to the process of the invention is advantageously usable as a mold material for metallic or ceramic castings. The great advantages of use of the material made by the process of the invention compared to the previously available materials used for such purposes is that molds can be produced from the composite powder material produced by the process of the invention above described that can be used repeatedly rather than discarded after one use. Molds can be made by tamping, making a paste and converting the material into a plastic condition. To convert the material into a plastic condition, it is practical first to heat a pasty mass of the composite powder product, as dried after decantation and filtration, to a temperature in the range of 40° to 90° C., preferably 50° C., at which agglomeration takes place as the result of sintering. Instead of such a procedure, the composite powder can also be filled into a casting box or form, and then a pattern of the casting ultimately to be made can be pressed into the mass and finally the mass of material surrounding the pattern can then be hardened by exposure to vapors of alcohol or formaldehyde.

DESCRIPTION WITH REFERENCE TO THE DRAWING

A flow chart of the process of the invention is illustrated in the single FIGURE of the drawing. As there shown, the filler is first suspended in a water solution of phenolformaldehyde which furnishes the binder as well as the suspension medium. If a novolac resin belonging to the group of phenolformaldehyde resins is used, this resin is dissolved hot in a lye solution. On the other hand, it is also possible instead to use resols that are normally obtained in water-containing form.

When the binder-filler suspension has been prepared, it is then mixed with acidulated water in a blast pipe jet or nozzle, the acidulated water preferably having a temperature lying between 40° and 70° C. The filler grains evenly coated with a skin of binder have been found to be at once easily filtered out or separated by decantation because of the relatively high temperature applied to the mixing of the suspension and the precipitating acid liquid, and after filtration or decanting or both, the product can be dried at temperatures of 60° C. or even higher. The acid content of the precipitating liquid depends upon the kind of binder used and its quantity, which is to say, depends on the concentration of the cations in the binder-filler suspension. It must be high enough so that in any case a full neutralization of the binder-filler suspension is produced, and furthermore, in order to obtain a good end product, it must be great enough for the acid to be present in excess after mixing. Too great an excess of acid must however be avoided, for otherwise the binder may come out of solution in so brittle a state that in extreme cases, it can peel or chip off the filler grains.

EXAMPLE 6.5 kg of fine-grain electrographite is mixed with 3.5 kg of a novolac resin in the following manner: the resin is first dissolved with stirring and warming in 10 liters of 3% sodium hydroxide. To this solution the fine-grain electrographite is then added with further stirring. The precipitating liquid consisted of 80 liters of water acidulated with 500 g of concentrated hydrochloric acid, and was brought to a temperature of about 50° C. before use. It was then mixed with the alkaline suspension of electrographite by putting the two liquids through a nozzle with control of the streams of the respective liquids in such a way that the volume ratio of precipitation liquid to binder-filler suspension was about 8:1. After this mixing the resulting composite powder mixture was filtered out and dried. The filtrate was neutralized with sodium hydroxide to recondition the waste water. The precipitated composite powder has a high grade of fineness with uniform coating of the grains.

The above example is typical of the presently preferred mode of practicing the invention, but it will be evident that variations in process details are possible within the scope of the invention.

We claim:

1. A process for making a starting material for the manufacture of artificial graphite and graphite-bearing and graphite-like bodies, especially of the kind containing fine-grain graphites, comprising the steps of:

preparing, by means of mixing, a suspension of particles of a filler powder in an alkaline water solution of a pehnolformaldehyde resin salt formed by reacting a phenolformaldehyde resin with a water solution of an alkali metal hydroxide, said filler consisting of a powdered carbon substance selected from the group consisting of electrographite, natural graphite, carbon black, ground coke, and particulate mixtures of a plurality of the foregoing substances;

forming a coating of phenolformaldehyde resin on said filler particles in said suspension in said resin salt solution by immediate conversion of said dissolved resin salt into pure phenolformaldehyde resin in solid form deposited on said particles, accomplished by mixing acidulated water with said suspension;

separating the coated particles from the water by decantation, filtration, or both decantation and filtration; and drying the coated powder particles so separated.

2. A process as defined in claim 1 in which said alkaline water solution has a concentration of resin salt dissolved therein which is of the order of magnitude of 25% by weight, and in which said acidulated water is heated to a temperature in the range from 40° to 70° C. before the step of mixing said acidulated water with said suspension to form a phenolformaldehyde coating on said filler particles.

3. A process as defined in claim 1 in which said resin salt solution is made by dissolving a novolac resin in a water solution of alkali metal hydroxide.

4. A process as defined in claim 1 in which said resin salt solution is made by dissolving a resol resin in a water solution of alkali metal hydroxide.

5. A process for making molds for metallic or ceramic cast articles consisting of the steps set forth in claim 1, followed by the further steps of:

producing a plastic mass from the dried powder particles resulting from the process specified in claim 1 by compacting it into a paste;

pressing masses of the paste into bodies of desired shape and heating to a temperature in the range between 40° and 90° C. to coalesce and solidify the material.

6. A process for making molds for metallic or ceramic cast articles consisting of the steps set forth in claim 1, followed by the further steps of:

filling a casting box with the coated powder product of the process specified in claim 1, pressing and embedding a pattern of an article into said product held in said casting box, and solidifying the said product into a solid body by exposure to vapors of a substance selected from the group consisting of lower alcohols and formaldehyde and mixtures of lower alcohols and formaldehyde.

* * * * *